United States Patent [19]

Muffoletto et al.

[11] Patent Number: 5,312,458

[45] Date of Patent: May 17, 1994

[54] INTERNAL ELECTRODE AND ASSEMBLY METHOD FOR ELECTROCHEMICAL CELLS

[75] Inventors: Barry C. Muffoletto, Alden; Raymond J. Kuwik, Lancaster, both of N.Y.

[73] Assignee: Wilson Greatbatch Ltd., Clarence, N.Y.

[21] Appl. No.: 131,664

[22] Filed: Oct. 5, 1993

Related U.S. Application Data

[62] Division of Ser. No. 757,252, Sep. 10, 1991, Pat. No. 5,250,373.

[51] Int. Cl.$^5$ .............................................. B23P 19/00
[52] U.S. Cl. ................................. 29/623.1; 429/161; 429/199; 429/233; 429/241
[58] Field of Search ............... 429/161, 199, 233, 241; 29/623.1

[56] References Cited

U.S. PATENT DOCUMENTS

| | | | |
|---|---|---|---|
| 4,259,420 | 3/1981 | Feinman et al. | 429/116 |
| 4,296,185 | 10/1981 | Catanzarite | 429/48 |
| 4,495,266 | 1/1985 | Klinedinst et al. | 429/105 |
| 4,892,796 | 1/1990 | Champ et al. | 429/196 |

Primary Examiner—Prince Willis, Jr.
Assistant Examiner—M. Nuzzolillo
Attorney, Agent, or Firm—Hodgson, Russ, Andrews, Woods & Goodyear

[57] ABSTRACT

An electrode for an alkali metal electrochemical cell comprising a unitary conductive body having a pair of wing-like sections joined by an intermediate web section. The cell anode or cathode parts are in contact with corresponding ones of the electrode wing sections, and the electrode web section is adapted to be placed in contact with the cell conductive casing. This results in a case negative or case positive electrical configuration depending upon whether the anode or cathode parts are in contact with the electrode wing sections. In forming an anode-cathode sub-assembly the anode or cathode parts are joined to the electrode wing sections and then the electrode wing sections are folded relative to the electrode web section and toward each other in a manner to place the anode and cathode parts in operative contact with each other. The internal electrode and assembly method advantageously require only the electrode intermediate web section to be bonded to the cell casing thereby allowing the cell to be assembled in a relatively quick and easy manner.

8 Claims, 3 Drawing Sheets

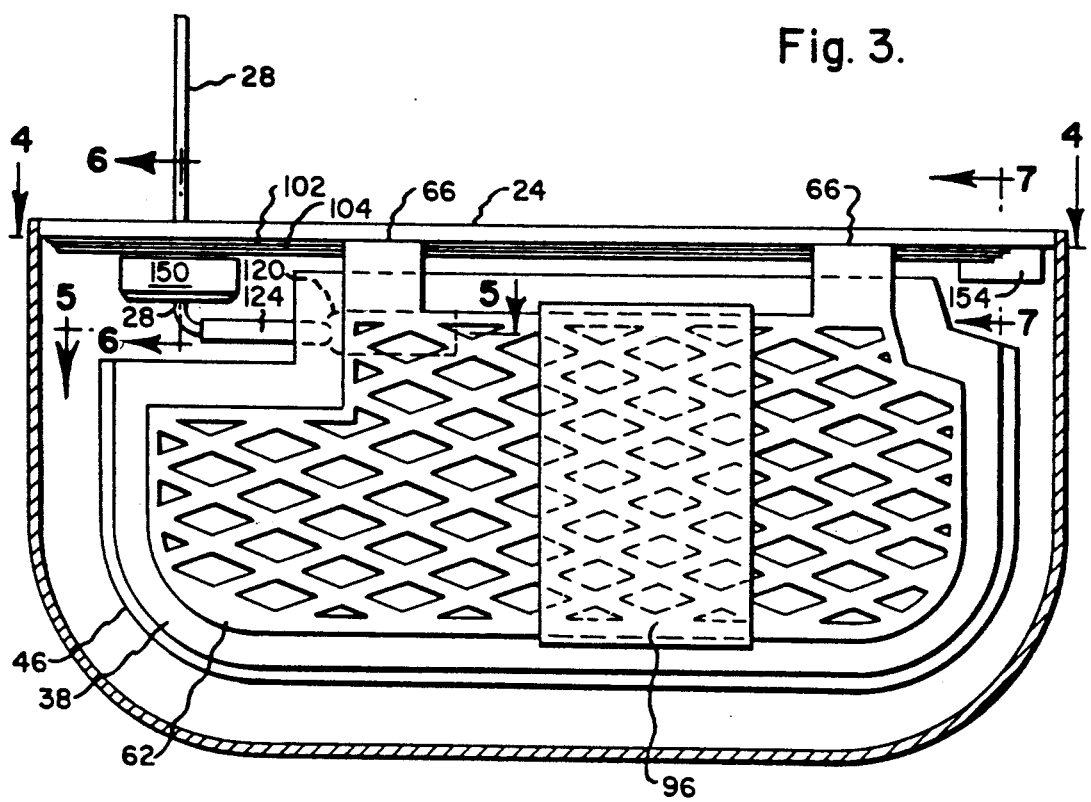
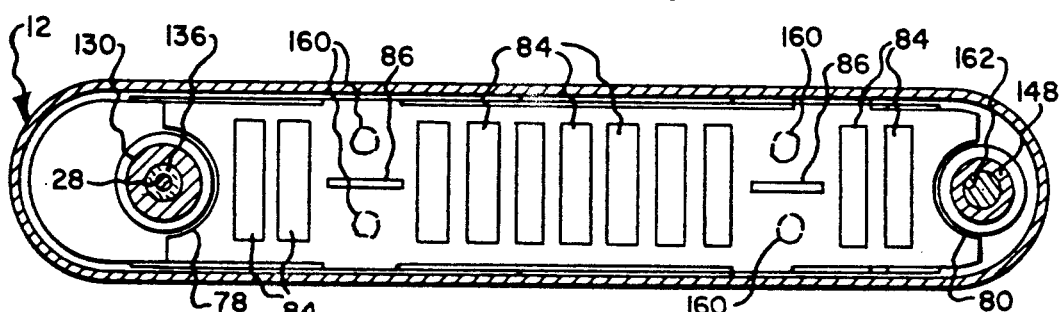
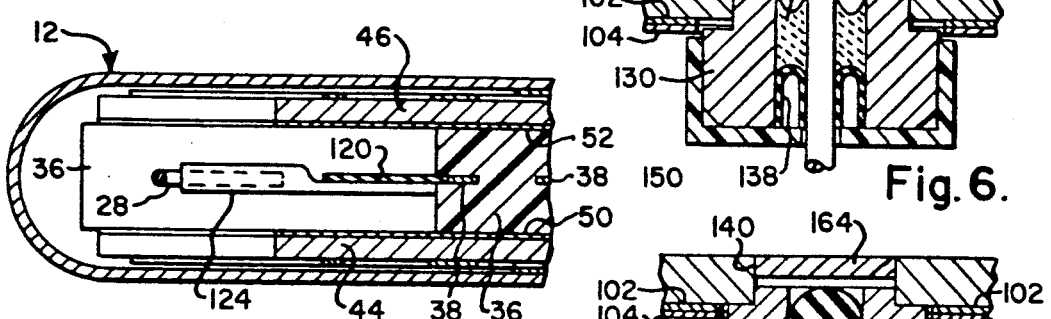

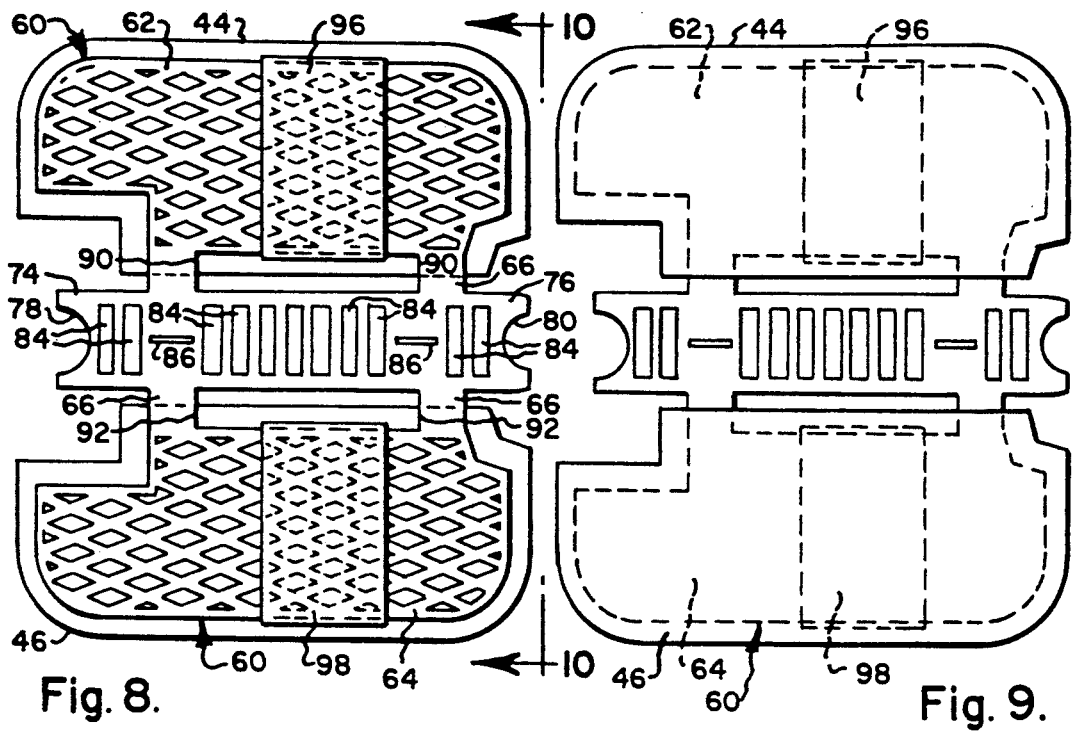
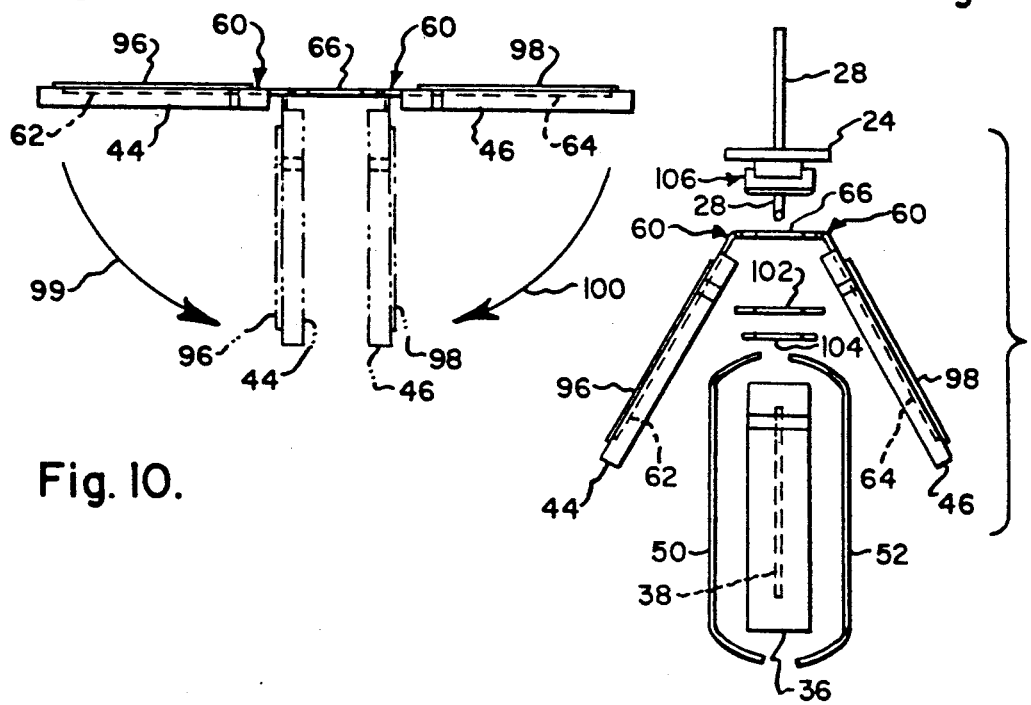

INTERNAL ELECTRODE AND ASSEMBLY METHOD FOR ELECTROCHEMICAL CELLS

This is a divisional of copending application(s) Ser. No. 07/757,252 filed on Sep. 10, 1991, now U.S. Pat. No. 5,250,373.

BACKGROUND OF THE INVENTION

This invention relates to the art of electrochemical cells, and more particularly to a new and improved internal electrode and assembly method for alkali metal/solid cathode and alkali metal/oxyhalide cells.

The recent growth in small-sized electronic devices has required electrochemical cells having high energy density and current delivery capability. As a result of this need alkali metal/solid cathode and alkali metal/oxyhalide cells have been developed wherein the anode typically is lithium and the electrolyte is either solid or liquid. In designing such cells it has been found to be advantageous to provide a casing of stainless steel or like conductive metal in operative contact with either the anode or the cathode to provide, respectively, a case negative or case positive electrical configuration. However, this necessitates welding or otherwise bonding components of the anode or cathode to the casing which can add difficulty and time to the assembly operation.

SUMMARY OF THE INVENTION

It is, therefore, a primary object of this invention to provide a new and improved internal electrode and assembly method for alkali metal/solid cathode cells and for alkali metal/oxyhalide cells.

It is a further object of this invention to provide such an electrode and assembly method for cells having a conductive casing in a case positive or case negative electrical configuration.

It is a more particular object of this invention to provide such an electrode and assembly method which avoids the necessity of bonding components of the cell anode or cathode to the cell casing.

It is a more particular object of this invention to provide such an electrode and assembly method which enables the cell in which it is contained to be manufactured in a relatively quick and easy manner.

The present invention provides an electrode for an alkali metal electrochemical cell comprising a unitary conductive body having a pair of wing-like sections joined by an intermediate web section. The cell anode or cathode parts are in contact with corresponding ones of the electrode wing sections, and the electrode web section is adapted to be placed in contact with the cell conductive casing. This results in a case negative or case positive electrical configuration depending upon whether the anode or cathode parts are in contact with the electrode wing sections. In forming an anode-cathode sub-assembly the anode or cathode parts are joined to the electrode wing sections and then the electrode wing sections are folded relative to the electrode web section and toward each other in a manner to place the anode and cathode parts in operative contact with each other.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 3 is an enlarged sectional view taken about on line 3—3 in FIG. 1;

FIG. 4 is a sectional view taken about on line 4—4 in FIG. 3;

FIG. 5 is a fragmentary sectional view taken about on line 5—5 in FIG. 3;

FIG. 6 is a fragmentary sectional view taken about on line 6—6 in FIG. 3;

FIG. 7 is a fragmentary sectional view taken about on line 7—7 in FIG. 3;

FIG. 8 is a plan view of the anode assembly in the cell of FIGS. 1-7;

FIG. 9 is an opposite plan view of the anode assembly of FIG. 8;

FIG. 10 is an elevational view taken about on line 10—10 in FIG. 8 and illustrating a step in the method of the present invention;

FIG. 11 is a developed view illustrating the method of making an anode-cathode assembly according to the method of the present invention.

DETAILED DESCRIPTION OF THE ILLUSTRATED EMBODIMENTS

Figure 1:
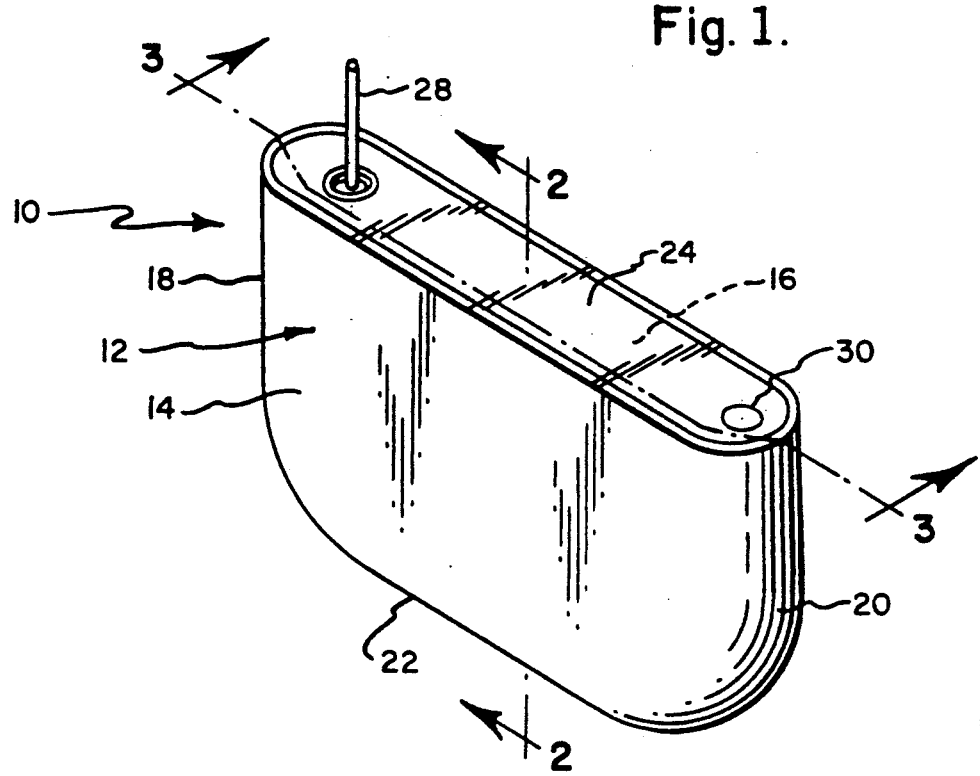
FIG. 1 is a perspective view of an electrochemical cell including an internal electrode according to the present invention.

Referring now to FIG. 1, there is shown an alkali metal/solid cathode electrochemical cell 10 including an internal electrode according to the present invention. The internal electrode and other cell components are contained within a casing 12 of metal such as stainless steel including spaced-apart sidewalls 14,16 joined by curved end walls 18,20 and a curved bottom wall 22. The open top of casing 12 is closed by a lid 24.

The internal electrode of the present invention can be used with alkali metal/solid cathode or alkali metal/oxyhalide electrochemical cells of both solid cathode and liquid electrolyte types. In the solid cathode type, for example a lithium-solid cathode cell, a solid cathode material such as silver vanadium oxide is contained within casing 12 and surrounded by a separator. A lithium anode also is in the casing. External cell electrical connection is provided by a terminal lead 28 and by a contact region comprising lid 24 or the entire conductive casing 12 which is insulated from lead 28. In the liquid cathode/electrolyte type, for example a lithium-oxyhalide cell, liquid electrolyte fills the casing interior and is in operative contact with the anode and with a cathode element comprising a carbon body having a cathode current collector embedded therein. A separator is employed between the anode and the carbon cathode. For a more detailed description of such a liquid electrolyte cell reference may be made to U.S. Pat. No. 4,440,453 issued Jan. 20, 1981 and entitled "High Energy Density Battery System" and assigned to the assignee of the present invention, the disclosure of which is hereby incorporated by reference.

Figure 2:
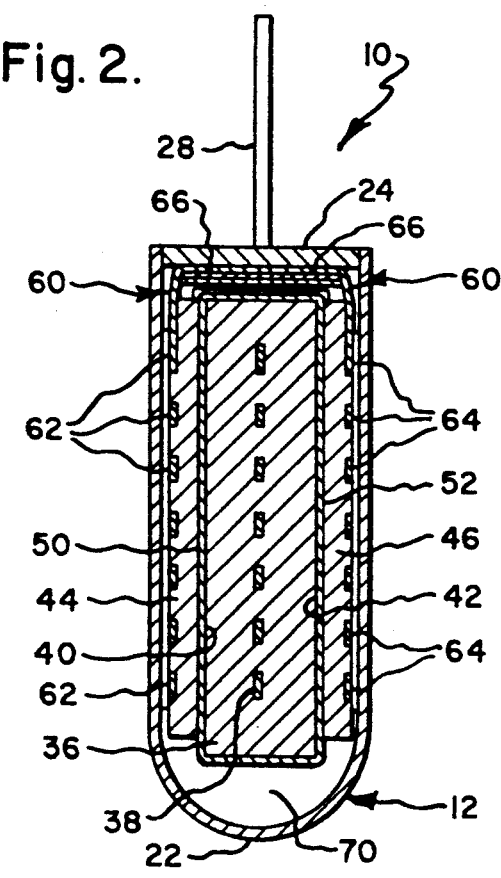
FIG. 2 is an enlarged sectional view taken about on line 2—2 in FIG. 1.

Referring now to FIG. 2, the cell 10 according to this embodiment of the present invention is of the liquid electrolyte type comprising a cathode in the form of a body 36 of cathode material which will be described in detail presently. A cathode current collector 38 embedded in body 36 is joined to lead 28 which extends through lid 24 and is electrically insulated from the same in a manner which will be described. Cathode body 36 has a pair of oppositely directed surfaces 40 and 42 which are operatively associated with a pair of lithium anode elements or plates 44 and 46, respectively. In particular, lithium anode element 44 is in operative contact with cathode body surface 40 through a thin sheet of separator material 50. Similarly, lithium anode element 46 is in operative contact with cathode body surface 42 through a thin body of separator material 52 which surrounds the cathode pellet.

In accordance with the present invention, cell 10 includes an electrode generally designated 60 comprising a unitary body having a pair of wing-like sections 62 and 64 joined by an intermediate web section 66. Lithium anode elements 44 and 46 are in contact with and carried by corresponding ones of the electrode wing sections 62 and 64, respectively. In particular, lithium elements 44 and 46 are pressure bonded to electrode wing sections 62 and 64, respectively, in a manner which will be described in detail presently. The electrode web section 66 is in operative contact with casing 12, in particular being joined to the underside of lid 24.

Cell 10 is completed by a liquid electrolyte 70 in casing 10. Lead 28 is the positive electrical terminal, being connected to the cathode. With electrode 60 being in operative contact with the conductive casing 12, the cell 10 of this embodiment of the present invention is in a case negative electrical configuration.

The electrode assembly of the present invention is shown in further detail in FIGS. 8 and 9. Electrode 60 is fabricated from a thin sheet of metal, preferably nickel, and wing-like sections 62 and 64 are of mesh formation to facilitate adherence to the lithium anode elements 44 and 46, respectively. Each wing section has a length greater than the length of the web section, and the widths of the wing sections are equal. One end of each wing section, the left end as viewed in FIG. 8, extends beyond the corresponding end of the web a distance greater than that by which the opposite end extends to accommodate other cell components as will be described. The central web section 66 is provided with extending tabs 74 and 76 terminating in semi-circular cutouts 78 and 80, respectively, at opposite ends thereof to facilitate assembly in the cell as will be described. Web section 66 also is provided with longitudinally spaced, laterally extending slots or rectangular cutouts 84 which are separated into three groups divided by longitudinally extending slots 86. The junctions between the web section 66 and the two-wing like sections 62 and 64 are provided with elongated rectangular openings or slots 90 and 92, respectively, to facilitate folding during assembly which will be described.

The lithium anode elements 44 and 46 are of the same shape or configuration as the corresponding electrode wing sections 62 and 64, respectively. In addition, each lithium anode element 44 and 46 is of slightly larger size or surface area as compared to the corresponding electrode wing section 62 and 64 so as to define a marginal or peripheral extension or border surrounding the periphery of the wing section. Thus, the length of each of the lithium anode elements 44 and 46 is slightly greater than the length of the corresponding electrode wing section 62 and 64. The width of each lithium anode element 44 and 46 is of an extent such that it terminates slightly beyond the long edge of the corresponding wing section 62 and 64, and at the opposite side terminates a short distance form electrode web section 66 in an edge which is located substantially midway along the corresponding opening 90 and 92. Each of the lithium anode elements 44 and 46 is pressure bonded to the corresponding electrode wing section 62 and 64 in a manner well known to those skilled in the art, this being facilitated by the mesh formation of the wing sections 62,64 in a known manner. Thus, lithium anode elements 44 and 46 are joined to electrode wing sections 62 and 64 so as to be in contact with and carried by the wing sections 62 and 64 and spaced from the web section 66. In the cell shown, the electrode assembly is completed by a pair of rectangular lithium elements or sheets 96 and 98 on sides of the electrode wing sections 62 and 64 opposite the lithium plates 44 and 46, respectively. Lithium sheets 96,98 are optional and may be provided to insure long-term contact between the anode and anode current collector. Sheets 96,98 are of smaller thickness and smaller surface area as compared to the lithium elements 44,46 and are located slightly offset longitudinally from the mid-points of the electrode wing sections 62 and 64.

FIGS. 10 and 11 illustrate the method of forming an anode-cathode subassembly according to the present invention. The electrode assembly of FIGS. 8 and 9 is provided and is shown in solid lines in FIG. 10. The electrode wing sections 62,64 with anode lithium elements 44,46 and lithium sheets 96,98 carried thereby are folded relative to web section 66 and toward each other as shown in broken lines in FIG. 10 in the direction of arrows 99,100. They are folded in a manner to place the lithium anode parts in operative contact with the cathode to provide an anode-cathode subassembly. The method is further illustrated in FIG. 11 wherein the electrode wing sections 62,64 are shown in position intermediate to the final position to which they are folded to place the lithium anode parts 44,46 in operative contact with the cathode body 36. The relative positions between the separator sheets 50 and 52 and the lithium anode elements 44 and 46 is shown in FIG. 11 as well as the location of shielding and insulating sheets 102 and 104, respectively, between electrode web section 66 and cathode body 36 as will be described. FIG. 11 also illustrates the location of a header assembly 106 relative to the electrode web section 66, the terminal lead 28 extending through the header assembly for making connection to cathode current collector 38 in a manner which will be described.

A completed cell including the anode-cathode subassembly illustrated in FIG. 11 is shown in FIGS. 3-7. Cathode current collector 38 is provided with a tab 120 welded thereto and extending outwardly therefrom wherein it is welded to one end of a coupling element 124, the other end of which is welded to the inner end of terminal lead 28. Lead 28 is fixed relative to lid 24 by a generally cylindrical ferrule element 130 which is fitted at one end to an opening 132 in lid 24 as shown in FIG. 6 and secured thereto such as by welding. The space between lead 28 and ferrule 130 is filled by a glass seal 136 which extends along the major portion of the length of element 130. Glass seal 136 insulates lead 28 electrically from lid 24. An elastomeric seal member 138 can be provided which is fitted in element 130 and faces toward the interior of the cell casing as shown in FIG. 6. Glass seal 136 normally is resistant to corrosion from the cell chemicals and therefore seal 138 is optional. The welding shield 102 in the form of an elongated strip is located adjacent the inner surface of lid 24 and is of suitable material such as mica. The insulator strip 104 of suitable material such as Tefzel is located between welding shield 102 and the remainder of the cell. Lid 24 is provided with a fill opening 140 shown in FIG. 7 adjacent the opposite end in a known manner, and a fill ferrule 148 is welded in the portion of opening 140 adjacent the inner surface of lid 24 as shown. An insulator 150 in the form of a cap of suitable material such as Tefzel can be provided to cover the portion of ferrule 130 below lid 24 as shown in FIG. 6. Similarly, an insulator 152 can be associated with ferrule 148. In particular, insulator 152 is of suitable material such as Tefzel and includes a cap portion 154 for covering the portion of ferrule 148 extending below lid 24 and a strap portion 156 extending from cap 154 and along strip 104.

The cell of FIGS. 3-7 is assembled in the following manner. First, the anode assembly as shown in FIG. 10 is provided. Next, ferrule 130 is welded to lid 24 in opening 132 and, similarly, ferrule 148 is welded to lid 24 in opening 140. Pin 28 is fixed in ferrule 130 by means of glass seal 136, and elastomeric seal 138 if used is put in place. Next, strips 102,104 are positioned against the lower surface of lid 24 and insulator cap 150 is placed on ferrule 130. After that, strips 102,104 are pivoted about their connection to element 130 and the electrode web section 66 is welded to lid 24 at the locations designated 160 in FIG. 4. The strips 102,104 are then pivoted back to overlie the electrode web section 66. Next, cathode body 36 containing current collector 38 is brought into proximity, and the electrode wing sections 62,64 are folded toward the cathode body 36 with separators 50,52 therebetween and the entire assembly is placed in the casing 12 with lid 24 closing the opening thereof. Lid 24 is then welded to the periphery of casing 12, and the mica shield 102 protects the remainder of the cell components from the heat during such welding. After liquid electrolyte is introduced to the interior of the casing through the fill opening 140, the opening is sealed first by the inner plug 162 of suitable material such as plastic or metal and then by the outer seal 164 which is welded to lid 24 in opening 140. Insulator 152 serves as a heat shield or barrier to protect the cell separators 50,52 when seal 164 is welded in place. The strap portion 56 of insulator 152 serves to space the cathode assembly from lid 24.

With the internal electrode 60 and assembly method according to the present invention, advantageously only the electrode web section is bonded to the cell casing, i.e. to lid 24, and bonding of components of the anode or cathode to the cell casing is avoided. This, in turn, enables the cell to be assembled in a relatively quick and easy manner.

By way of example, in an illustrative cell, the material of cathode body 36 is a silver vanadium oxide cathode material as described in U.S. Pat. Nos. 4,310,609 issued Jan. 12, 1982 and 4,391,729 issued Jul. 5, 1983, both assigned to the assignee of the present invention, the disclosures of which are hereby incorporated by reference. Cathode current collector 38 is of titanium, separators 50,52 are of polypropylene, electrolyte 70 is a 1.0 Molar solution of lithium hexafluoroarsenate prepared by dissolving lithium hexafluoroarsenate in equal quantities of DEM (GYLME) and propylene carbonate, pin 28 is of molybdenum, coupling element 124 is of titanium, glass seal 136 is of TA-23 Hermetic sealing glass, and ferrules 130 and 148 together with plug 164 and fill ferrule are of stainless steel.

Figure 12:
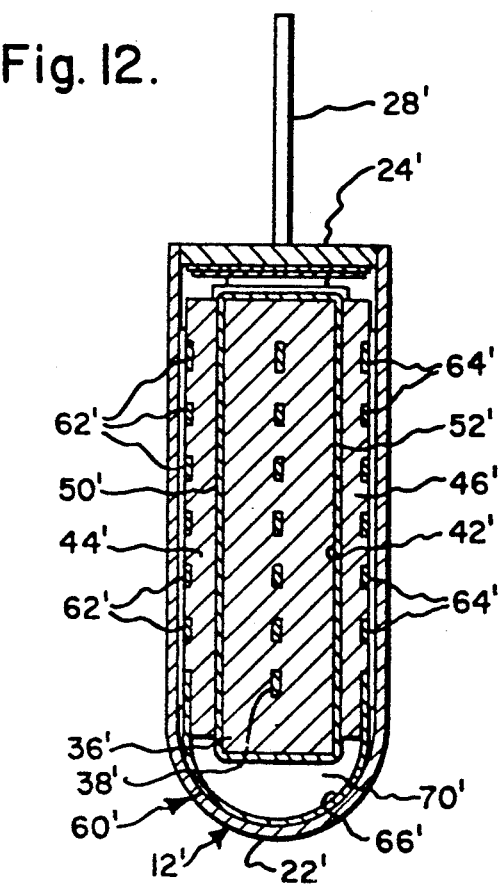
FIG. 12 is a sectional view similar to FIG. 2 illustrating an alternative embodiment of the electrode of the present invention.

FIG. 12 illustrates an alternative embodiment of the internal electrode of the present invention as it would appear in a completed, assembled cell. Components in the embodiment of FIG. 12 identical to those in the embodiment of FIG. 1-11 are identified by the same reference numerals provided with a prime designation. In this embodiment, the electrode web section 66' is shaped to conform to the shape of the inner surface of casing 12' at a location generally opposite lid 24'. In particular, electrode web section 66' is shaped to conform to the inner surface of the casing curved bottom wall 22'. The anode-cathode sub-assembly is formed in a manner similar to that illustrated in FIGS. 8-11. In the assembly of the cell, cathode current collector 38' is connected to pin 28' and the insulator arrangement is provided in a manner similar to that described in connection with FIGS. 3-5, and the anode-cathode sub-assembly is inserted in casing 12' with the curved electrode web portion 66' placed in contact with the curved inner surface of casing bottom 22'. If desired, web portion 66' can be bonded such as by welding to the inner surface of bottom wall 22'. The remainder of the assembling of the cell of FIG. 12, including welding lid 24' in place, introducing electrolyte 70' and closing the fill opening in lid 24' is performed in a manner similar to that described in connection with the embodiment of FIGS. 1-11. The completed cell is in a case negative electrical configuration.

The internal electrode of the present invention can also be employed in a case positive electrical configuration. In particular, in the embodiments of FIGS. 1-12, with the lithium anode elements contacting the internal electrode 60, which, in turn, contacts the conductive cell casing 12, the cell is in a case negative electrical configuration. A case positive electrical configuration is provided by placing the cathode parts in contact with the internal electrode 60 which, in turn, is in contact with the conductive cell casing 12. In particular, and referring to the anode-cathode subassembly of FIG. 11, a case positive electrical configuration is provided by replacing lithium anode elements 44,46 with cathode current collector elements on the electrode wing sections 62,64. The lithium sheets 96,98 also would be removed. Cathode body 36 and current collector 38 would be replaced by a pair of lithium anode elements or plates sandwiched together and against an anode current collector which, in turn, is connected to pin 28 and insulated from lid 24. With the cathode parts in contact with electrode wing sections 62,64 and with the electrode web section 66 in contact with the cell casing, a cell is provided in a case positive electrical configuration.

It is therefore apparent that the present invention accomplishes its intended objects. While embodiments of the present invention have been described in detail, that is for the purpose of illustration, not limitation.

What is claimed is:

1. A method of making an anode assembly for an alkali metal/solid cathode electrochemical cell having a conductive casing comprising the steps of:
   a) providing an electrode in the form of a unitary body having a pair of wing-like sections joined by an intermediate web section;
   b) providing an alkali metal anode comprising two parts; and c) joining said anode parts to corresponding ones of said electrode wing sections so as to be in contact with and carried thereby and spaced apart by said web section so that said web section can be placed in contact with said conductive casing to provide a case negative electrical configuration.

2. A method according to claim 1, further including the step of folding said electrode wing sections relative to said web section and toward each other in a manner to place said anode parts in operative contact with a cathode to provide an anode-cathode sub-assembly.

3. A method of making an alkali metal/solid cathode electrochemical cell comprising the steps of:
   a) providing a metal casing having an opening at one end;
   b) providing an electrode in the form of a unitary body having a pair of wing-like sections joined by an intermediate web section;
   c) providing an alkali metal anode comprising two parts;
   d) joining said anode parts to corresponding ones of said electrode wing sections so as to be in contact with and carried thereby and spaced apart by said web section;
   e) providing a cathode;
   f) folding said electrode wing sections relative to said web section and toward each other in a manner to place said anode parts in operative contact with said cathode to provide an anode-cathode sub-assembly and;
   g) placing said anode-cathode sub-assembly in said casing in a manner placing said electrode web section in contact with said casing to provide a case negative electrical configuration; and
   h) sealing said casing.

4. A method according to claim 3, wherein said step of placing said anode-cathode sub-assembly in said casing comprises the steps of:
   a) providing a metal header;
   b) joining said metal header to said electrode web sections;
   c) inserting said anode-cathode sub-assembly into said casing through the open end thereof and so that said header closes said open end and contacts said casing.

5. A method according to claim 4, further including welding said header to said casing so as to seal said casing.

6. A method according to claim 3, wherein said step of placing said anode-cathode sub-assembly in said casing comprises:
   a) shaping said electrode web section to conform to the shape of the inner surface of said casing at a location generally opposite said open end of said casing; and
   b) inserting said anode-cathode sub-assembly into said casing through the open end thereof and placing said electrode web section in contact with the inner surface of said casing at said location.

7. A method of making an electrode assembly for an alkali metal/oxyhalide electrochemical cell having a conductive casing, an alkali metal anode, a liquid cathode/electrolyte in operative contact with said anode, and a cathode current collector, wherein one of said anode or said cathode current collector is in two parts, said method comprising the steps of:
   a) providing an electrode in the form of a unitary body having a pair of wing-like sections joined by an intermediate section; and
   b) joining said anode or said cathode current collector parts to corresponding ones of said electrode wing sections so as to be in contact with and carried thereby and spaced apart by said web section so that said web section can be placed in contact with said conductive casing to provide a case negative or positive electrical configuration depending upon whether said anode or said cathode current collector parts are joined to said electrode sections.

8. A method according to claim 7, further including the step of folding said electrode wing sections relative to said web section and toward each other in a manner to place the parts carried by said wing sections in operative contact with the other of said anode or said cathode current collector parts to provide an anode-cathode sub-assembly.

* * * * *